United States Patent
Rich et al.

(10) Patent No.: US 8,644,271 B2
(45) Date of Patent: Feb. 4, 2014

(54) COMMUNICATION PROTOCOL FOR A WIRELESS MESH ARCHITECTURE

(75) Inventors: Mark J. Rich, Menlo Park, CA (US); Randy Frei, San Jose, CA (US); Paul Gordon, Santa Clara, CA (US)

(73) Assignee: Trilliant Networks, Inc., Redwood City, CA (US)

( * ) Notice: Subject to any disclaimer, the term of this patent is extended or adjusted under 35 U.S.C. 154(b) by 902 days.

(21) Appl. No.: 12/072,238

(22) Filed: Feb. 25, 2008

(65) Prior Publication Data

US 2008/0310346 A1    Dec. 18, 2008

Related U.S. Application Data

(63) Continuation of application No. 10/636,382, filed on Aug. 7, 2003, now Pat. No. 7,336,642.

(51) Int. Cl.
*H04W 4/00* (2009.01)
(52) U.S. Cl.
USPC ............ 370/338; 370/328; 370/330; 370/347
(58) Field of Classification Search
None
See application file for complete search history.

(56) References Cited

U.S. PATENT DOCUMENTS

| | | | |
|---|---|---|---|
| 4,905,233 A | 2/1990 | Cain et al. | |
| 4,939,726 A | 7/1990 | Flammer et al. | |
| 5,115,433 A | 5/1992 | Baran et al. | |
| 5,602,838 A | 2/1997 | Kartalopoulos | |
| 5,606,551 A | 2/1997 | Kartalopoulos | |
| 5,719,868 A | 2/1998 | Young | |
| 5,742,593 A | 4/1998 | Sharony et al. | |
| 5,949,760 A | 9/1999 | Stevens et al. | |
| 6,480,497 B1 | 11/2002 | Flammer, III et al. | |
| 6,493,377 B2 | 12/2002 | Schilling et al. | |
| 6,813,260 B1 | 11/2004 | Fogle | |
| 7,167,503 B2 | 1/2007 | Schilling et al. | |
| 2002/0012740 A1 | 1/2002 | Benado | |
| 2002/0071448 A1 | 6/2002 | Cervello et al. | |
| 2002/0093929 A1 | 7/2002 | Mangold et al. | |

(Continued)

FOREIGN PATENT DOCUMENTS

| | | |
|---|---|---|
| EP | 1 320 220 A2 | 6/2003 |
| WO | 99-16214 A1 | 4/1999 |

(Continued)

OTHER PUBLICATIONS

Jubin, John et al., The DARPA Packet Radio Network Protocols, Proceedings of the IEEE, vol. 75, No. 1, Jan. 1987, pp. 21-32.

(Continued)

*Primary Examiner* — Ian N Moore
*Assistant Examiner* — Jackie Zuniga Abad
(74) *Attorney, Agent, or Firm* — Moser Taboada (57) ABSTRACT

A wireless mesh communication protocol that dynamically assigns communication time-slots and frequencies to mesh nodes. A first node is established as a PC that sequentially polls other nodes. A second node responds at a predetermined time with information that includes database records, and then a third node responds similarly. The second node is then established as the PC and the first node is polled during dynamically allocated time-slots and on a frequency that depend on the second node's database records. The third node is then established as a PC and acts similarly. In both cases the first node responds by sending information and data records. The first node is then re-established as the PC. The first node then polls the second and third nodes at times and frequencies that depend on the first node's database records.

20 Claims, 9 Drawing Sheets

(56) References Cited

U.S. PATENT DOCUMENTS

| | | |
|---|---|---|
| 2002/0141376 A1 | 10/2002 | Kandala |
| 2002/0143982 A1 | 10/2002 | Kandala |
| 2002/0176396 A1 | 11/2002 | Hammel et al. |
| 2004/0105412 A1 | 6/2004 | He et al. |

FOREIGN PATENT DOCUMENTS

| | | |
|---|---|---|
| WO | 01-11828 A1 | 2/2001 |
| WO | 01-11833 A1 | 2/2001 |
| WO | 01-20851 A1 | 3/2001 |
| WO | 01-33770 A2 | 5/2001 |
| WO | 02-05455 A2 | 1/2002 |
| WO | 02-05491 A1 | 1/2002 |
| WO | 02-07388 A2 | 1/2002 |
| WO | 02-13429 A1 | 2/2002 |
| WO | 02-37754 A2 | 5/2002 |
| WO | 02-41586 A2 | 5/2002 |
| WO | 02-41590 A1 | 5/2002 |

OTHER PUBLICATIONS

Maltz, David A. et al., "Experiences Designing and Building a Multi-Hop Wireless Ad Hoc Network Testbed," Mar. 5, 1999.
Maltz, David A., "Resource Management in Multi-hop Ad Hoc Networks," Nov. 21, 1999.
Leiner, Barry M. et al., "Issues in Packet Radio Network Design," Proceedings of the IEEE, vol. 75, No. 1, Jan. 1987, pp. 6-20.
Lee, Sung-Ju, "Routing and Multicasting Strategies in Wireless Mobile Ad hoc Networks," 2000.
Pearlman, Marc R. et al., "On the Impact of Alternate Path Routing for Load Balancing in Mobile Ad Hoc Networks," Copyright 2000 IEEE, pp. 3-10.
Lin, Chunhung Richard et al., "Bandwidth Routing in Ad Hoc Wireless Networks," Copyright 1998 IEEE, pp. 2477-2482.
Lin, Chunhung Richard et al., "QoS Routing in Ad Hoc Wireless Networks," IEEE Journal on Selected Areas in Communications, vol. 17, No. 8, Aug. 1999, pp. 1426-1438.
Lin Chunghung Richard et al., "Adaptive Clustering for Mobile Wireless Networks," IEEE Journal on Selected Areas in Communications, vol. 15, No. 7, Sep. 1997, pp. 1265-1275.
Gupta, Piyush et al., "A System and Traffic Dependent Adaptive Routing Algorithm for Ad Hoc Networks," Proceedings of the 36th Conference on Decision & Control, Dec. 1997, pp. 2375-2380.
Pursley, Michael B. et al., "Routing for Multimedia Traffic in Wireless Frequency-Hop Communication Networks," IEEE Journal on Selected Areas in Communications, May 1999, pp. 784-792.
Leon-Garcia, "Communication Networks—Fundamental Concepts and Key Architectures," published Jan. 15, 2000.
Loso, Francis G., "Surrogate Digital Radio Network Architecture Development for Task Force XXI," Copyright 1997 IEEE, pp. 1-5.
Lee, D. et al., "A Wireless Token Ring Protocol for Ad-Hoc Networks," Aerospace Conference Proceedings, 2002. IEEE Mar. 9-16, 2002, Piscataway, NJ USA, vol. 3, Mar. 9, 2002, pp. 1219-1228.

| FIELD | KEY | TYPE | UNITS | BYTES |
|---|---|---|---|---|
| NODE | X | NODE ID | | 8 |
| LATITUDE | | FLOAT | DEGREES | 8 |
| LONGITUDE | | FLOAT | DEGREES | 8 |
| LACCURACY | | INTEGER | m | 2 |
| ORIENTATION | | INTEGER | deg T | 2 |
| OACCURACY | | INTEGER | deg | 2 |
| NANTENNA | | INTEGER | | 1 |
| BY | | NODE ID | | 8 |
| AT | | TIME | SECONDS | 8 |
| SEQUENCE | | INTEGER | | 4 |

FIG. 4A

| FIELD | KEY | TYPE | UNITS | BYTES |
|---|---|---|---|---|
| NODE | X | NODE ID | | 8 |
| FUNCTION | | INTEGER | none, rx, tx,... | 1 |
| TIME SLOT | X | INTEGER | [0, m-1] | 1 |
| FREQUENCY | | INTEGER | [0, n-1] | 1 |
| ANTENNA | | INTEGER | | 1 |
| OTHER NODE | | NODE ID | | 8 |
| EXPIRATION TIME | | TIME | SECONDS | 4 |
| PRIORITY | | INTEGER | | 1 |
| BY | | NODE ID | | 8 |
| AT | | TIME | SECONDS | 8 |
| SEQUENCE | | INTEGER | | 4 |

| FIELD | KEY | TYPE | UNITS | BYTES |
|---|---|---|---|---|
| NODE | X | NODE ID | | 8 |
| MAX. BANDWIDTH | X | INTEGER | KBYTES/S | 2 |
| PRIORITY | | INTEGER | | 1 |
| BY | | NODE ID | | 8 |
| AT | | TIME | SECONDS | 8 |
| SEQUENCE | | INTEGER | | 4 |

| FIELD | KEY | TYPE | UNITS | BYTES |
|---|---|---|---|---|
| SOURCE NODE | X | NODE ID | | 8 |
| DESTINATION NODE | X | NODE ID | | 8 |
| COST | | FLOAT | | 4 |
| DYNAMIC | | INTEGER | | 1 |
| HOP | | NODE IDs | | 20 X 8 |
| BY | | NODE ID | | 8 |
| AT | | TIME | SECONDS | 8 |
| SEQUENCE | | INTEGER | | 4 |

COMMUNICATION PROTOCOL FOR A WIRELESS MESH ARCHITECTURE

CROSS-REFERENCE TO RELATED APPLICATIONS

This application is a continuation of co-pending U.S. patent application Ser. No. 10/636,382, filed Aug. 7, 2003, which is herein incorporated by reference.

BACKGROUND OF THE INVENTION

1. Field of the Invention

This invention relates generally to wireless networks. More particularly, this invention relates to communication protocols that are suitable for wireless mesh networks.

2. Description of the Related Art

The appetite for information continues to grow the Internet. Because of such growth new information is constantly being added, which fuels even more growth. Such growth has caused bandwidth problems in many areas. Indeed, yesteryear's limited bandwidth telephone dial-up services are rapidly being replaced with broad bandwidth systems such as digital subscriber lines (DSL) and cable modems. Unfortunately, such systems are not available to a significant portion of the population. Moreover, the acquisition and installation costs associated with such systems make them unappealing to some users and to some service providers.

An alternative to wired communication systems is wireless communications. Wireless communication systems can be deployed very rapidly and at less cost than its wired counterparts. Wireless communication systems that use cellular phone technologies are becoming commonplace, primarily because they provide mobile Internet connectivity. Unfortunately, most cellular phone systems tend to be severely bandwidth limited.

A wireless communication system that can provide a bandwidth comparable to DSL and cable modem technologies, but that is less difficult and costly to install, uses a mesh network. As described in U.S. patent application Ser. No. 10/122,886, filed Apr. 15, 2002 and in U.S. patent application Ser. No. 10/122,762, filed Apr. 15, 2002, which are incorporated herein by reference, such a mesh network comprises a plurality of wirelessly connected nodes that communicate information traffic across a wide area. The individual nodes of the mesh network communicate using radio or microwave signals to pass information between a Mesh Gateway and Customer Premise Equipment (CPE). The Mesh Gateway itself is coupled to the remainder of the Internet, for example by a cable or by an optical fiber, while the CPEs are connected to the mesh network using roof mounted, multidirectional antennas. Those antennas implement an antenna array technology that provides for selectively switched directionality. Such roof top directional antennas can be directed in different directions and are very effective in connecting to neighboring nodes, which are described in more detail subsequently.

Mesh nodes with multiple directional antennas pose a problem. Both ends of a mesh communication link need to be using appropriate antennas or the link will not close. When multiple antennas are possible in each node, a mechanism to coordinate the communications is needed. Internet communication protocols for wireless and wired communications often use the IEEE 802.11 standard family of protocols. While these protocols are usually asynchronous using a distributed coordination function (DCF), an alternative point coordination function (PCF) is an option. The PCF is based on a polling technique wherein a network coordinating station polls other network nodes that the network coordinating station knows are connected to the network. To do so, the network coordinating station sends a beacon to all the network nodes within its transmission range announcing the beginning of a polling sequence. The network coordinating station then sequentially polls each network node, either delivering information to that node or requesting information from that node. The network nodes acknowledge being polled and then receive or send information to the coordinating station. Acknowledgement is typically performed in subsequent polling sequences.

Of course, the foregoing requires that the network coordinating station knows what other network nodes are within its transmission range. To obtain this information, a distributor coordination function (DCF) protocol found within the IEEE 802.11b protocol is used. DCF provides a controlled method of finding new entrants into the network, thus allow the PCF to operate for as long as one wants to poll. In practice, PCF polling can deliver nearly isochronous traffic.

To coordinate polling, a single station is assigned the role of polling coordinator (PC). The PC coordinates polling of various stations within reach of a network node.

While useful in many applications, a PCF and a PC in accord with the IEEE 802.11 protocol family may not be useful in many applications. For example, the IEEE 802.11 PCF function finds limited use in a wireless mesh network architecture where multiple nodes must coordinate polling. Such distributed polling coordination is not supported by the 802.11 protocol, but is necessary for mesh network functionality. Therefore, there is a need for a communication protocol that facilitates polling coordination distribution.

SUMMARY OF THE INVENTION

The present invention provides for a wireless mesh communication protocol that controls mesh node bandwidths by dynamically assigning time-slots and frequencies to the mesh nodes, i.e., the role of a conventional polling coordinator (PC) is distributed amongst the nodes of a mesh network. A first node is established as a PC that sequentially polls other nodes. A second node responds to the first node at a predetermined time with information that includes a second node database record. A third node responds similarly. The second node is then established as the PC and the first node is polled during dynamically allocated time-slots and on a frequency that depends on the second node's database records. The third node is then established as a PC and acts similarly. In both cases, the first node responds by sending information and first node data records, with the first node data records depending on the information that is to be sent that next time the first node acts as a PC. The first node is then re-established as the PC. The first node then polls the second and third nodes at times, durations, and frequencies that depend on the first node's data records.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention provides for a wireless mesh communication protocol that enables information sharing between consumer premise equipment (CPE) devices and the rest of a network such as the internet. Information is transferred between the network and the CPE devices via a succession of mesh nodes (described subsequently). Some of the mesh nodes can serve as routers, although routers having many more variables than conventional wired, internet routers. Whereas a conventional wired router only needs to determine how to route data to the ultimate destination, a mesh node router selects: how to route traffic to the ultimate destination; the devices it directly communicates with; and when and how to communicate with other mesh nodes. Decisions in any of these areas can and do affect the other decisions.

The wireless mesh communication protocol has two independent features: dynamic bandwidth allocation and information routing. The mesh network architecture and its communication protocol are such that some information available to one mesh node needs to be shared with other mesh nodes so that the mesh can perform its functions. Such information sharing is accomplished by incorporating a unique database in each mesh node router, with some of the information in a mesh node's database being shared with nearby mesh nodes. Database sharing enables an extended communication range and continued service even in the event of interference. This is accomplished by having the mesh nodes use the information in their databases to adapt to and route around network problems. The mesh network architecture and its communication protocol enable reduced deployment costs, since the mesh network configuration is self-determined in accord with the installed nodes.

Figure 1:
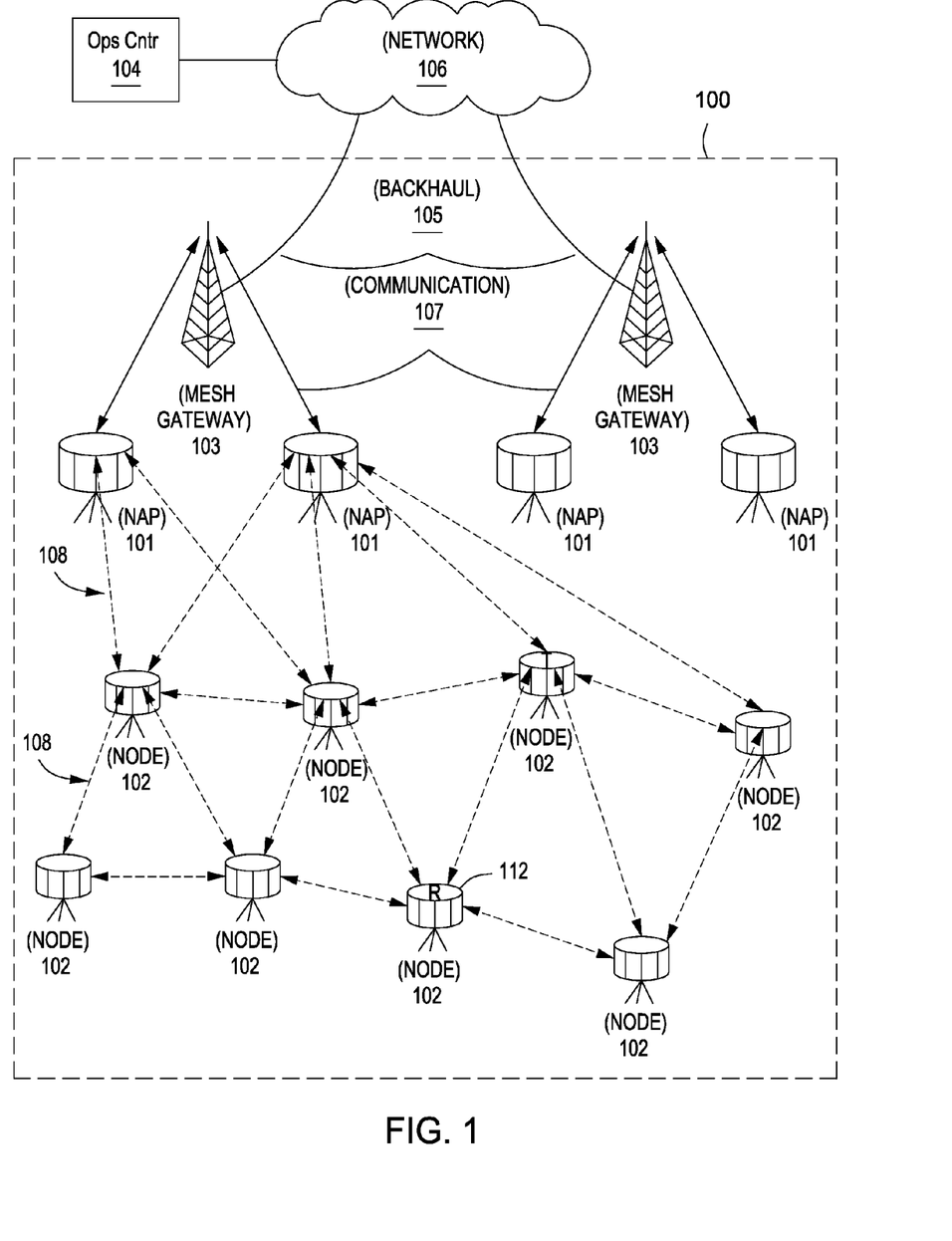
FIG. 1 is a network diagram depicting a mesh network in accordance with the present invention.

FIG. 1 illustrates a mesh network 100 that is in accord with the principles described in U.S. patent application Ser. No. 10/122,886, filed Apr. 15, 2002 and in U.S. patent application Ser. No. 10/122,762, filed Apr. 15, 2002. The mesh network 100 includes one or more Mesh Gateways 103, a plurality of network access points (NAPs) 101, and a plurality of network nodes 102. Internet traffic from a network node 102 is routed to a NAP 101, or from one network node 102 to another until such traffic is routed to its intended destination. Notably, the Mesh Gateways 103, the NAPs 101, and the network nodes 102 communicate with one another to form the wireless mesh network 100.

The Mesh Gateways 103 are coupled to one or more backhauls 105 that are coupled to a network 106, which may be coupled to an operations center (OC) 104. The network 106 may comprise a portion of the Internet or a private network.

The NAPs 101 can communicate with the Mesh Gateways 103, directly with the network 106 via backhaul communication links 107, and/or to nearby network nodes 102. It should be understood that backhauls may be wired or wireless. In an embodiment, wireless point-to-point communication between a Mesh Gateways 103 and a NAP 101 is via the Unlicensed National Information Infrastructure (UNII) band. However, other bands may be used. At locations where wired connectivity is available, wired connectivity may be used.

Each network node 102 is in wireless communication with at least one NAP 101 or with another network node 102. Thus, the network nodes 102 form, at least in part, a wireless Wide Area Network (WAN) using wireless interlinks 108. It should be understood that the network nodes 102 and the NAPs 101 may be configured for some combination of broadcasting, point-to-point communication, and multicasting. By broadcasting, it is meant transmitting without singling out any particular target recipient. By point-to-point communication, it is meant transmitting with singling out a particular target recipient. By multicasting, it is meant transmitting with singling out a plurality of particular target recipients. The mesh communication protocol that is used between the network nodes 102, between NAPs 101, between a NAP 101 and a network node 102, and between a NAP 101 and a Mesh Gateway 103 is described in more detail subsequently.

Figure 2:
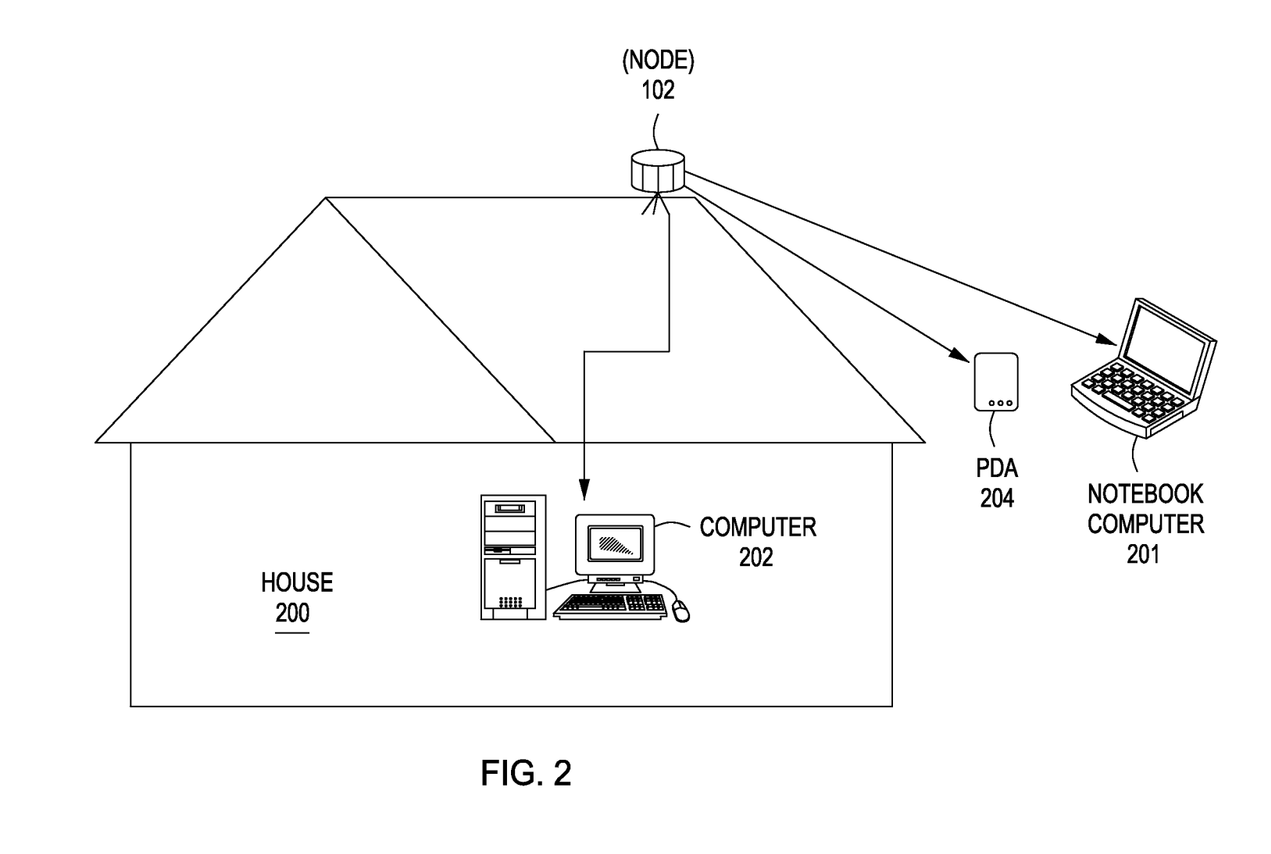
FIG. 2 is a diagram of a consumer location (a house) having consumer premises equipment (CPE) that forms part of a node in the mesh network.

Referring now to FIG. 2, a network node 102 physically may be located on a roof-top of a house 200, in a window, in an attic, on a telephone pole, and the like. The house 200 may have any of a variety of networked CPE devices such as computers, printers, set-top boxes, PDAs, and like devices. For purposes of illustration, a computer 202, a notebook computer 201, and a PDA 204 are shown as electronically connected to a network node 102 using wireless connectivity such as a wireless local area network (WLAN).

Figure 3:
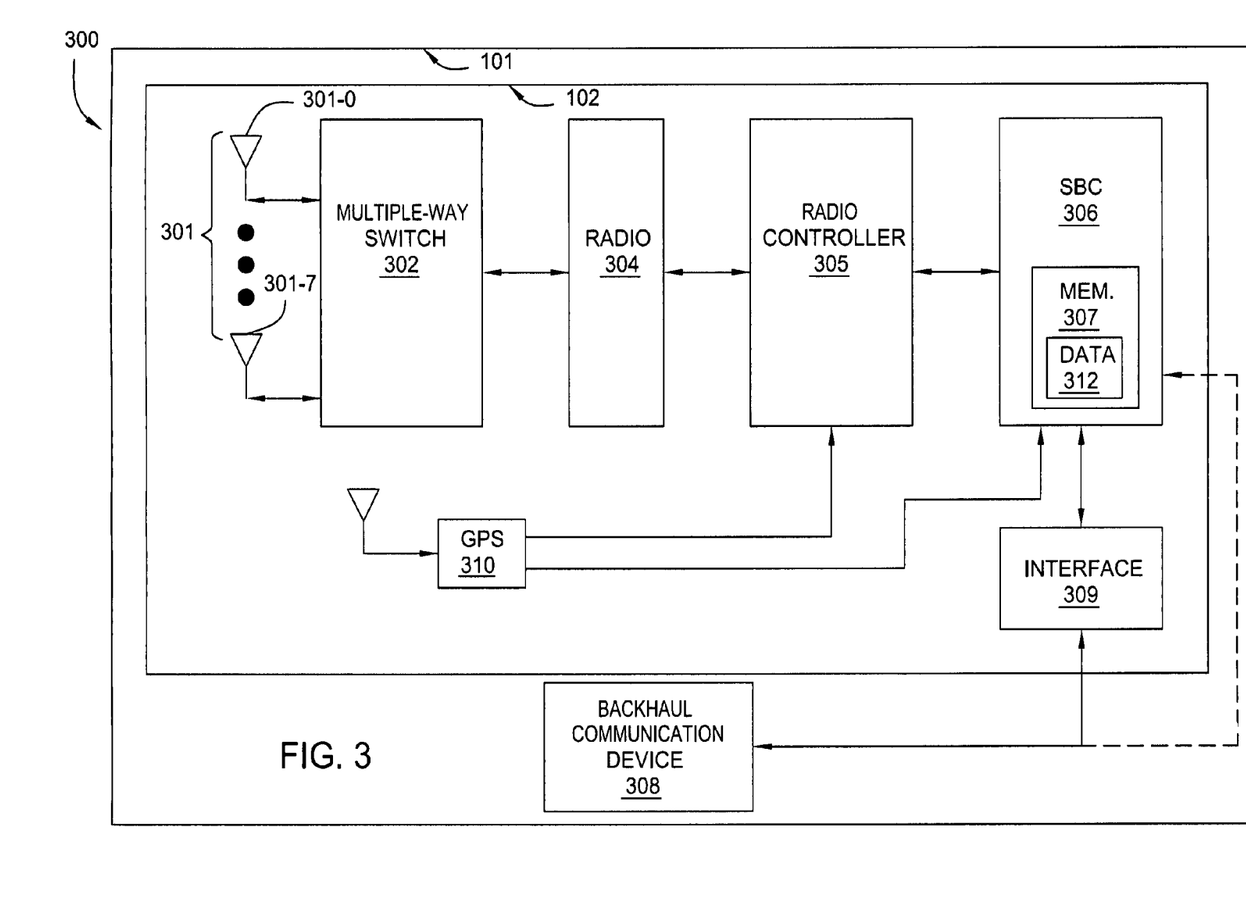
FIG. 3 is a block diagram of an exemplary portion of a node.

Referring now to FIG. 3, there is shown a block diagram of exemplary portions of a NAP 101 and a network node 102. It should be understood that a NAP 101 is a network node 102 that is located near an edge of the mesh network 100. Thus, the NAPs 101 and the network nodes 102 are collectively referred to hereinafter simply as nodes 300. Each node 300 includes a multi-sectored antenna 301 having sectors 301-0 to 301-7. Though an eight-sectored antenna 301 is described, the antenna 301 may comprise fewer or more sectors than eight. Though a sectored antenna 301 is described, other antenna configurations may be used, including but not limited to an omni-directional antenna, a collection of individually pointed directional antennas, a combination of a sectored antenna and an omni-directional antenna, and the like.

The antenna 301 is coupled to a multi-way switch 302 for selectively accessing a sector of the sectors 301-0 through 301-7. The sectors 301-0 through 301-7 may be arranged in banks, such that the multi-way switch 302 may be used to select a bank. The multi-way switch 302 is coupled to a radio 304 transceiver. In an embodiment, the radio 304 may be implemented using a 5.8 GHz UNII band radio. However, other radios with other frequencies also may be used. The radio 304 is coupled to a radio controller 305. In an embodiment, the radio controller 305 is implemented using a field programmable gate array. The radio controller 305 is coupled to a single board computer (SBC) 306 that includes a memory 307 for storing a data structure 312. The data structure 312 is a database that is comprised of a plurality of data records that are useful for the operation of the node 300. That database, its data records, and the uses of the database are described in more detail subsequently. The SBC 306 is configured for routing traffic, and in this context may be considered a router.

The SBC 306 is coupled to an interface 309, which may be a WLAN card, an Ethernet card, or the like. A backhaul communication device 308 is coupled to the SBC 306 via the interface 309. However, the backhaul communication device 308 can optionally be coupled directly to SBC 306. The specific backhaul communication device 308 that is used depends on the type of backhaul.

Optionally, a Global Positioning System (GPS) card 310 and an antenna 311 may be included. The GPS antenna 311 is coupled to the GPS card 310, which, in turn, is coupled to the radio controller 305 and to the SBC 306. The GPS system is highly useful in time keeping since all nodes 300, as well as all other elements of a system, can be synchronized in time. Alternate time-keeping systems are also well known. In any event accurate time synchronization of the nodes 300 is important to the mesh communication protocol.

Highlighting several features of the mesh network 100 may be helpful in understanding the present invention. First, the nodes 300 communicate using Time Division Duplex (TDD). In TDD, each node is provided with a specific time to send and a specific time to receive. Next, each node 300 has a radio that communicates within the mesh network 100 by sending and receiving information during short time-slots that are referenced to the start of a time frame. In a mesh network with 1000 equal sized time-slots in a one second time frame there are 1000 communication opportunities each second. If the total bandwidth of a node is 20 Mbits/sec then each time-slot can be used to transmit 20000 bits (assuming no overhead). If a node 300 uses 50 slots (5% of the total available) then the throughput of that node 300 is about 500000 bits/sec (which is better than DSL or a cable modem).

Each node 300 is one of two basic types. The first type is referred to as a rooftop radio. Rooftop radios are slave-only units that operate on a fixed frequency. Therefore the rooftop radios must be carefully configured so that adjacent rooftop radios do not interfere with each other. The other type of node 300 is capable of acting as a router that routes IP packets to and from their neighbors.

While the system illustrated in FIGS. 1-3 is generally useful, in practice it is convenient to use devices that meet the requirements of the IEEE 802.11 protocol family. This allows low cost, readily available devices to be used with the mesh network 100. However, the IEEE 802.11 protocol family implements point-to-point polling using a PCF in a manner that is not well-suited for mesh networks. For example, the mesh network 100 incorporates a tiered structure in which nodes 300 bi-directionally communicate not only with a mesh gateway 103, but also with each other and with "children," which are nodes 300 that are further hops from the mesh gateway 300. Additionally, at least some nodes 300 communicate with CPEs. Thus, the mesh communication protocol uses a PCF polling format in which the PCF function is "handed off" to other neighbor nodes 300.

The mesh communication protocol allocates bandwidth by assigning nodes 300 communication time-slots and frequencies. Referring to FIG. 1, the NAPs 101 and the network nodes 102 communicate with one another by sending and receiving information during short accurately scheduled time-slots that are referenced to the beginning of a time frame. By way of example and not limitation, each time frame may be approximately one second long, approximately beginning and ending on each second. By way of example and not limitation, a time-slot may be approximately one millisecond long. Thus, approximately 1000 time-slots might be available within a 1 second time frame. For convenience, each time frame may be divided into subframes. For example, a 1 second time-frame may be divided into five 200 one-millisecond subframes, each of which contains 200 ms time-slots.

While mesh communications are synchronized into time-slots using a time reference it should be understood that the time reference can be real time or an arbitrary synch time. For example, as shown in FIG. 3, a real time reference can be provided by satellite via the GPS card 310. Alternatively, an arbitrary time frame reference signal may be transmitted between nodes 300 at the beginning of a time frame using a special purpose time-slot. By way of example and not limitation, such a special purpose time-slot may be approximately 200 microseconds in duration.

By using synchronized time frames and time-slots, a PCF-type polling scheme can be implemented in the mesh network 100. According to the IEEE 802.11 protocol family a single station (point) is assigned the role of a Point Coordinator (PC). The mesh communication protocol uses the idea of a PC, but, to accomplish mesh communications, the PC role is passed from router node to router node within the mesh network 100 to form a distributed PC function. Using the PC function enables the mesh network 100 to use devices designed for IEEE 802.11, while passing the PC function from router node to router node enables a dynamic mesh. A node 300 that is currently assigned the PC function is referred to herein as a PC. When a PC assumes the PC function, it transmits a beacon that informs nearby nodes 300 and all CPEs not to send any traffic (information) until they are polled.

For convenience, the following assumes that a node 300 becomes a PC at the start of a subframe, and it will also be assumed that the role of PC is relinquished at the end of the subframe. When a node 300 is not a PC it is a receiving node.

During its subframe interval a PC polls other mesh devices (nodes 300 or CPEs) it knows about and receives data from or sends data to such other mesh devices. Router nodes 300 in their turn become PCs that receive and send data. In this manner, one node 300 informs another mesh device that information for it has been received and is incoming, or that information should be sent at the appropriate time-slot. Because of the bi-directional nature of polling communications one router node 300 can inform another that a message was received.

Thus every nodal entity shares time space. The mesh communication protocol dynamically assigns the PCF function to PCs within the network mesh so as to enable each mesh node 300 to poll for and to receive data. Additionally, because PCF is an 802.11b protocol, CPE devices are easily incorporated into the mesh network. Thus, data may be communicated to both types of devices.

While the foregoing network communication protocol provides for a dynamic mesh structure, an alternative embodiment constrains communication in some instances to one-way communications. In that embodiment when a node 300 becomes a PC, the node only transmits data in one direction. Then, the terminal access node (at the last hop) in one direction begins transmitting in the other direction. In this manner each access node only sends data, but each router node 300 bi-directionally communicates with the other nodes 300.

An additional, but optional, feature of the foregoing mesh communication protocol is PC polling in a manner that is consistent with the rules for point-to-point communications in the UNII band. Point-to-point communications requires that a single transmitter must be in communication with a single receiver. While this is easily accomplished in simple time-slotted communications, in the mesh network 100 the duration of a communication with an individual node 300 is unknown and highly variable. To meet the requirements for point-to-point communications without wasting bandwidth by delaying communications because of fixed time-slots, a polling schedule is established prior to information sharing. That schedule is coordinated with the Mesh Gateways 103, with the PC node 300, with the other nodes 300, and with the CPE devices. This is accomplished using a series of scheduling messages that coordinate the time-slot sizes and node sequences.

It should be understood that scheduling decisions are made semi-autonomously on each node 300. This allows for infinite scaling of the size of the mesh network 100. By semi-autonomously it is meant that each node makes its scheduling decisions based on its knowledge of the other nodes 300 within an area known as the interference area. The interference area represents the area around a node 300 in which another node 300 can potentially interfere. The interference area is conveniently approximated by a radius, r, which may be estimated using an RF propagation model. Such a model depends on the frequency band, on transmit power, on terrain, vegetation, buildings, and the like. It should be noted that the interference area is larger than the area over which communication between a given node and another node actually occurs.

The mesh communication protocol is such that if a time-slot reserved for a particular device (node 300 or CPE) occurs when no information is to be sent to that device, or if information is still being sent to the previously scheduled device the particular device is freed to perform other tasks. This enables mesh network devices to schedule information sharing times in a manner such that if no information is to be shared then the device is free to do other tasks until its next scheduled time-slot.

The dynamic determination of the time-slots that can be used without interfering with any other node 300 in the mesh network 100 uses two pieces of information. First, what nodes are in their interference area, and second what time-slots those other nodes are currently using. The two pieces of information are dynamic in that new nodes 300 can be added, albeit at a relatively slow rate, while time-slot allocations can change rapidly (e.g., every second).

The two pieces of information are passed amongst the router nodes by incorporating a dynamic, partially shared database in each router node 300. Every router node 300 can make changes to its database, and then some of those changes are transmitted to neighboring nodes. The neighboring nodes in turn update their database and then pass some of those changes to their neighboring nodes. This sharing of database information is implemented in a manner such that when a receiving node 300 finds that the originator node 300 (the one that made the original proposal) is outside of the receiving node's interference area, the receiving node 300 no longer passes any information about the originator node to any of the receiving node's neighbors. In this way each router node builds, retains, and partially shares a database having information about the components of the mesh network around its location. However, no node 300 has a complete view of the mesh network, nor does any node 300 need one.

The database of a node 300 is stored in the data structure 312, reference FIG. 3. Such a database includes information on node locations, antenna directions, slot usage, control parameters, and routing, among other types of information. FIGS. 4A through 4D illustrate examples of data records of the database. The information in FIGS. 4A through 4D is provided by way of example, and accordingly other fields and field information types and values may be used. Each example data record comprises a "Field," "Key," "Type," "Units," and "Bytes" column. "Field" indicates a type of information for a field. "Key" indicates a key field in a database. "Type" describes the field information, such as node identification, integer, time, and floating point value. "Units" indicate the measurement units. "Bytes" indicate the storage space allocated for such field information.

A "Node" field identifies a node 300 for which a respective data record pertains. An "At" field designates a time at which a data record was created or modified. A "By" field indicates which node created or modified such a data record. A "Sequence" field in each record indicates an incremented record number that is used for a repair protocol, in particular for establishment of a database on a node 300 to the network 100.

Figure 4A:
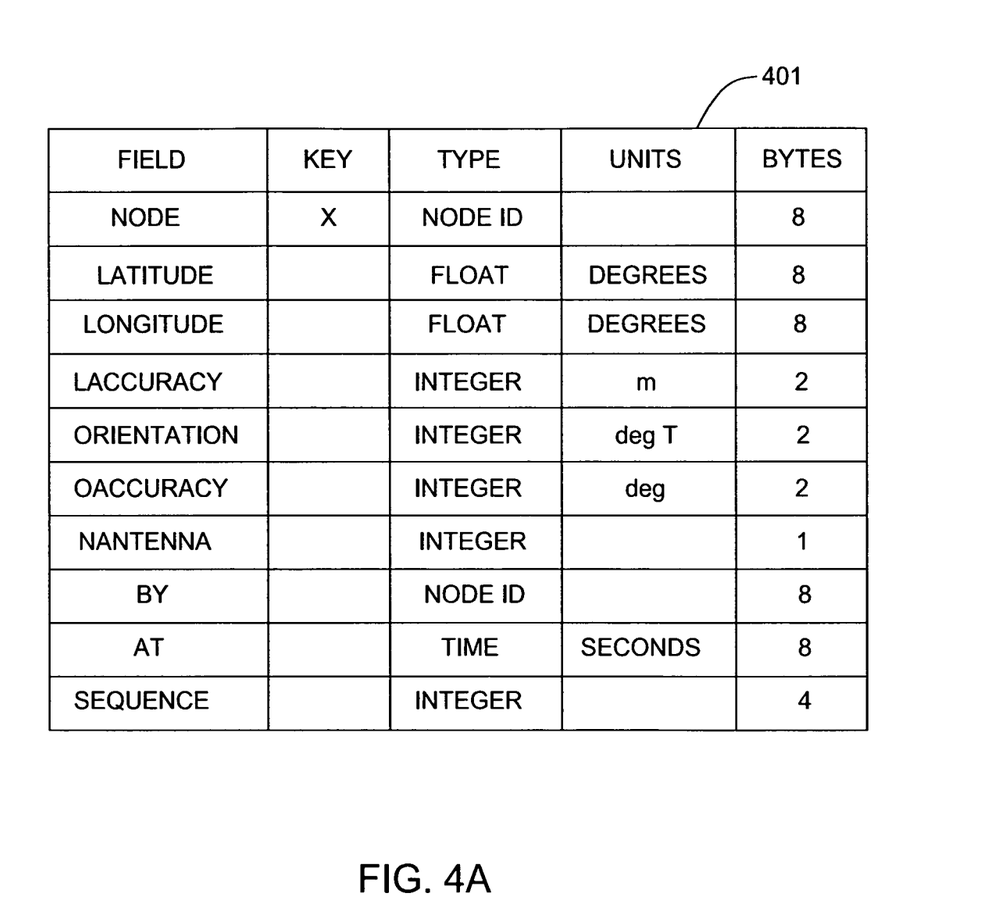
FIGS. 4A through 4D illustrate tables of exemplary database records in accordance with the present invention.

Data record 401 of FIG. 4A is a locator record and comprises "Latitude" and "Longitude" fields, among other fields previously described herein. A "Latitude" field indicates a latitudinal position of a node 300 or which the data record 401 pertains, and a "Longitude" field indicates the longitudinal position of that node 300. This information may be obtained from a GPS or from another source of such information. The field "Laccuracy" is accuracy in meters of a location estimate. In other words, a node is within so many meters of a specified latitude and longitude. The field "Nantenna" is a number of antenna sectors. The field "orientation" is a direction in which an antenna sector, for example sector 0, is pointing. This value is in degrees relative to true north. With a fixed array of equally spaced antenna sectors, the orientations of other sectors may be computed using fields "Nantenna" and "orientation". The field "Oaccuracy" is accuracy in degrees of an orientation estimate. By using the information from the data record 401, the antenna azimuth and beam width may be derived by the node 300.

Figure 4B:
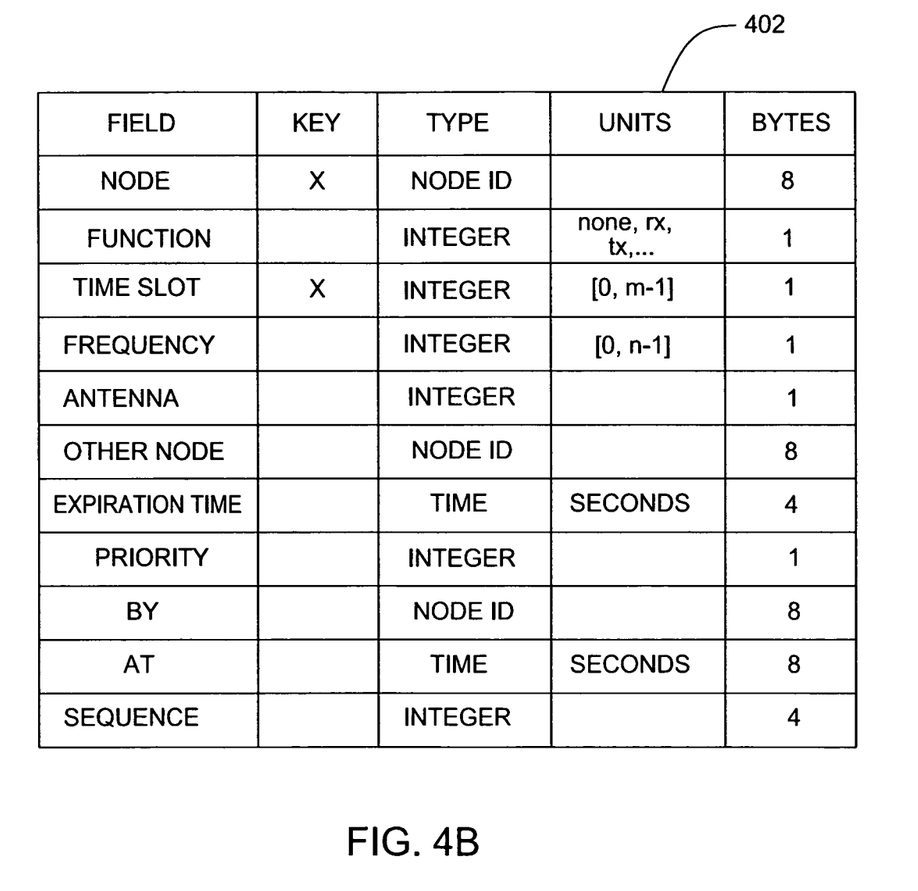

The data record 402 of FIG. 4B is a slot usage data record. The data record 402 is updated to allocate or de-allocate a communication time-slot. Any node 300 may update the data record 402. Updates to time-slot allocation records may be made by transmitting, tx, and by receiving, rx, record pairs. The data record 402 comprises "Function," "Time Slot," "Frequency," "Antenna," "Other Node," and "Expiration Time" fields, among other fields described herein.

A "Function" field indicates a function for a communication time-slot, such as not presently allocated ("none"), transmit, or receive. A "Time Slot" field indicates a selected time slot t from 0 to m−1 of m time slots for execution of a transmit or a receive function. A "Frequency" field indicates a select frequency f from 0 to n−1 of n frequencies for execution of a transmit or a receive function. An "Antenna" field indicates a sector selected for execution of a transmit or a receive function. An "Other Node" field identifies a target recipient node for a message. However, other node field could be a multicast or a broadcast indicator. An "Expiration Time" field indicates an expiration time for allocation of a slot for a function. After the expiration time has lapsed, the nodes treat function for data record 402 as "none." However, prior to lapsing, expiration time may be reset for additional communication time-slot usage. A "Priority" field indicates a priority value for slot allocation. If all slots are allocated, priority may be given to one subscriber over another based on a priority value. This priority value may be from 0 to some integer p. The "By," "At," and "Sequence" fields were described previously.

Figure 4C:
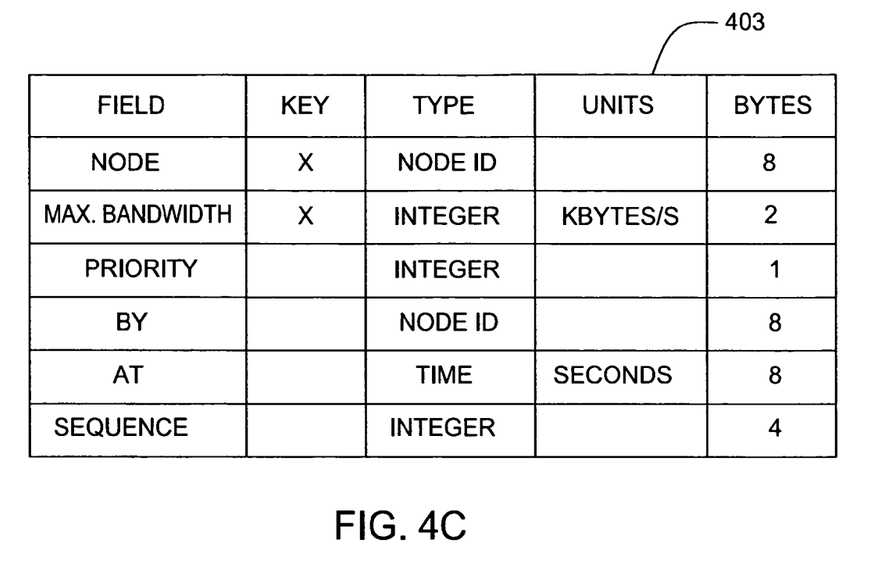

The data record 403 of FIG. 4C is a control parameter data record. In addition to the Node, Priority, By, At and Sequence fields previously described, the data record 403 comprises a "Max. Bandwidth" field which indicates a maximum bandwidth limit allocated to the node identified in the data record.

Figure 4D:
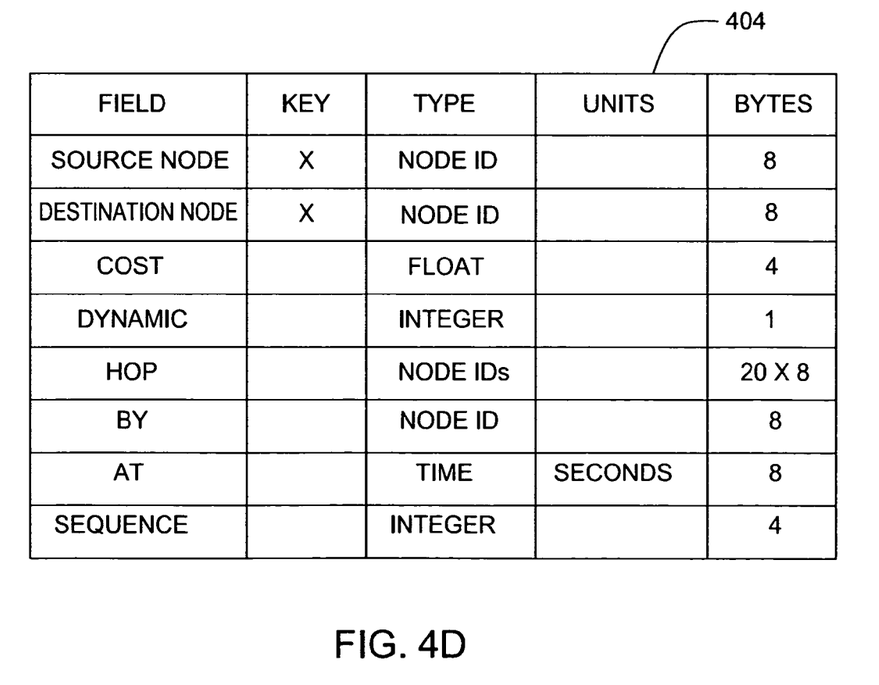

The data record 404 of FIG. 4D is a routing cost data record. In addition to the By, At and Sequence fields previously described, data record 404 comprises "Source Node", "Destination Node", "Cost", "Dynamic", and Hop fields. A "Source Node" field indicates a source node or a beginning point on a route. A "Destination Node" field indicates a target destination of such a route, namely, a final destination for such a route. A "Dynamic" field indicates whether dynamic or static routing is to be used. A "hop" field indicates a route selected from one or more known routes for routing traffic from a source node to a destination node. A "Cost" field indicates a determined cost for sending such a message from a source node to a destination node. Such a cost may be statically or dynamically determined.

It should be understood that data records illustratively shown in FIGS. 4A through 4D are not meant to include all possible data records. Other data records may include current and alternative routes, control and status information, distance and azimuth between each pair of nodes, among others. Furthermore, it should be understood that one or more fields illustratively shown may be omitted in implementing one or more aspects of the present invention. Moreover, it should be understood that the nodes 300 each maintain a portion of the database for the overall mesh network 100, and thus a shared or distributed database among the nodes 300 is provided for. Furthermore, it should be appreciated that mesh network 100 may function without centralized control.

As noted the database is used for scheduling. A PC node 300 must ensure that it has sufficient bandwidth within its allocated time-slots to transfer (hop) that information to the next node 300 along a transmission route. Furthermore, each node 300 must know when it is to poll with, either by sending or receiving, other nodes. To do so, each node must compare polling information against its existing time-slot allocations (which are available in its database records). If a PC has an excess number of time-slots (and thus excess bandwidth), time-slots should be de-allocated to free the time-slots (bandwidth) for other nodes. However, if more time-slots (bandwidth) are required, the PC first determines which time-slots of the time frame are available. This is determined by taking into account the use of the other nodes in the interference area, their relative locations, the directional antennas that are using, and the RF transmission models. From this analysis a matrix of available time-slots that could be used to communicate with a designated receiving node is developed. The PC then randomly selects as many of these time-slots as required, makes the appropriate database updates, and advertises the decision to the other nodes 300 in its interference area. At the same time, of course, other nodes are making competing decisions based on their own needs.

Figure 5:
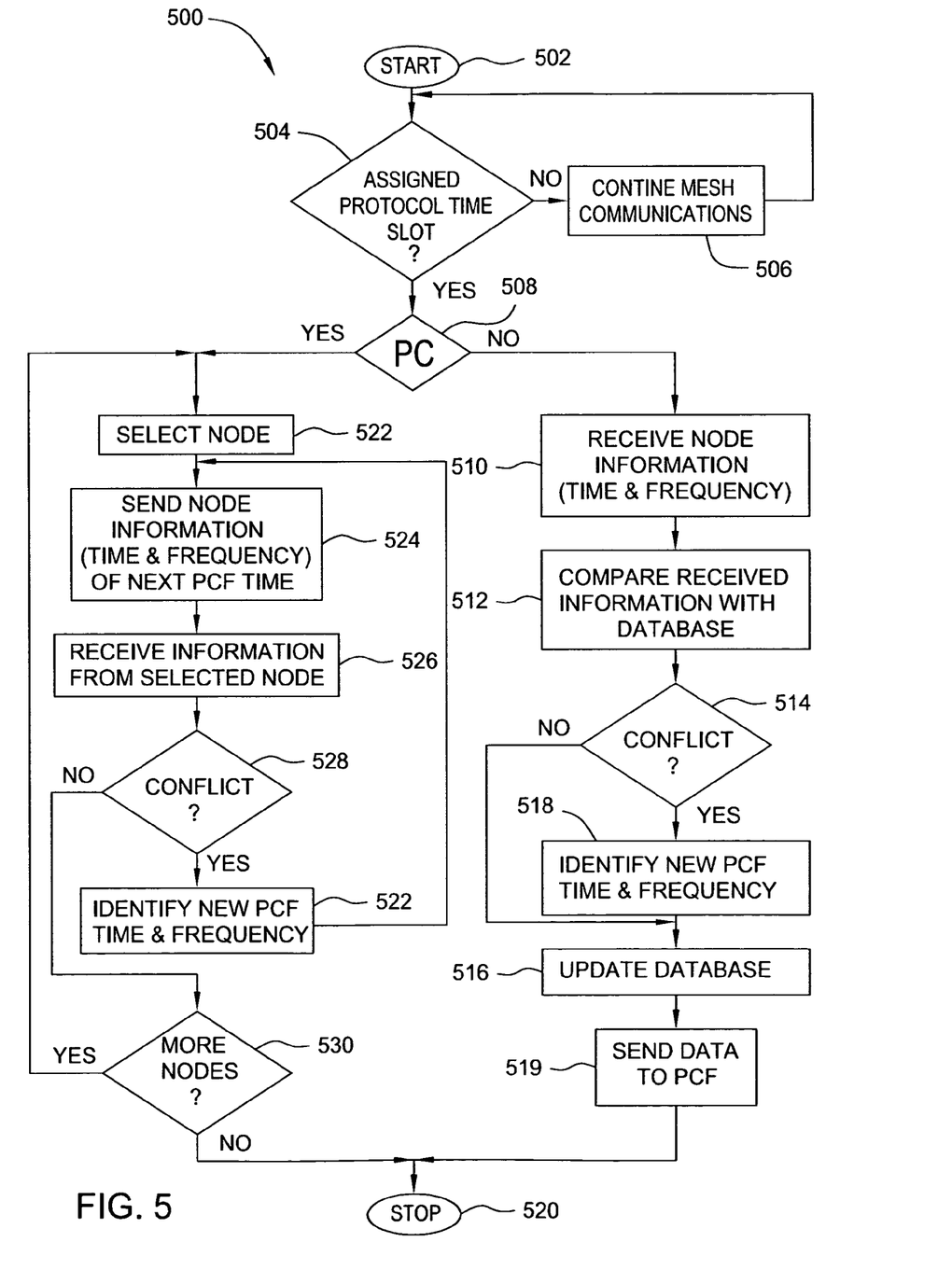
FIG. 5 is an operational flow diagram of a mesh communication protocol used by the nodes.

FIG. 5 illustrates an operational flow diagram of a mesh communication protocol used by the nodes 300. As shown, the protocol 500 begins at step 502. At step 504, a determination is made as to whether the current time is within an assigned protocol time-slot. To do so, the host node 300 (the node whose protocol 500 operation is being explained) searches its database record of assigned protocol time-slots and compares them against the current time, such as by using the GPS card 310. If the current time is not within an assigned protocol time-slot, at step 506 the host node 300 continues the mesh communication assignments and loops back to step 504.

If in step 504 the current time is found to be within an assigned protocol time-slot, at step 508, a determination is made as to whether the host node 300 is a PC or a polled node. If the host node 300 is a polled node, at step 510 the host node receives information from a PC. That information includes time and frequency information about the nodes, including the host node, within the interference area of the PC. The time and frequency information relates to the times and frequencies at which the nodes in the interference area are to be polled or act as PCs.

At step 512, the host node compares its received information against information in the host node's database. At step 514, a determination is made as to whether any scheduling conflict exists. For example, a scheduling conflict would exist if two nodes within the interference area of the host node would act as PCs at the same time, or if any two nodes within the interference area of the host node would be polled at the same time and frequency.

If no scheduling conflict is identified at step 514, at step 516 the host node's database is updated with new information. However, if a scheduling conflict is identified, at step 518 the host node 300 searches its database to find new polling times and frequencies that would avoid the identified conflict. Then, at step 516, the host node's database is updated. At step 519, polling information stored in the host node's database is then sent to the PC, and at step 520 the protocol 500 stops.

If at step 508 the host node 300 is found to be a PC, at step 522 the host node selects a node to be polled. That selection is based on the current time, and on the information stored in the host node's database. After node selection, at step 524 the host nodes send information to the selected node. That information includes time and frequency information about the polling of the nodes in the host node's interference area. Such time and frequency information represent the proposed times and frequencies that each of the nodes within the host node's interference area are to act as either receiving nodes or PCs.

After step 524, at step 526 the host node receives information back from the selected node. That received information includes time and frequency data that relates to the times and frequencies that the selected node proposes as the times and frequencies that each of the nodes within the host node's interference area should act as receiving nodes and PCs. At step 528, the host node compares its received information against information previously sent to identify any conflict. Ideally, the received information and the previously sent information are the same. If that is correct, at step 530 a determination is made as to whether there is another node to be polled. If so, protocol 500 loops back to step 522 to select another node. Otherwise, if there is not another node, at step 520 the protocol 500 stops.

However, if a change was made to the sent information, at step 528 a determination is made as to whether a scheduling conflict exists. It should be understood that the selected node might have made changes that do not result in scheduling conflicts. If there is no conflict, the protocol 500 advances to step 530, which operates as previously described. However, if a conflict exits, at step 532 the host node searches its database to identify new times and frequencies that would avoid the identified conflict. Then, the protocol 500 loops back to step 524 for sending the proposed new information to the selected node.

Once the selected node and the PC agree on scheduling, the databases of those nodes are updated with the agreed upon information and then those nodes continue their normal mesh communication operations.

The use of the new polling time-slots begins as soon as a receiving node and the PC agree. Agreement does not have to be explicit. Once neither the receiving node nor the PC find a conflict, changed information is not sent. This inferentially results in agreement. Also, no response is generated by or required from the other potentially interfering nodes. Conflicts are rare since the time-frequency-spatial decision space is so large, but conflicts can occasionally occur. The mesh protocol should then detect and handle such collisions by having one node 300 acquiesce to not getting its desired time-slot, and then choosing a different time-slot. In the unlikely event that there are not enough free time-slots, the node 300 can de-allocate time-slots used for lower priority traffic.

Figure 6:
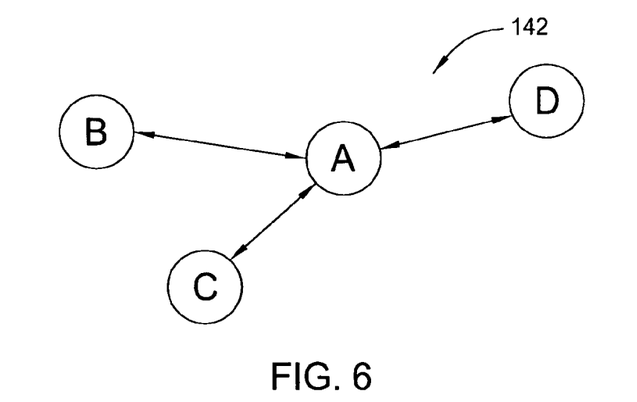
FIG. 6 illustrates an exemplary mesh network neighborhood.

FIG. 6 illustrates an exemplary neighborhood 142 of nodes 300 that communicate in accord with the present invention. The neighborhood 142 should be understood as a subsection of the mesh network 100 of FIG. 1. As shown, the neighborhood 142 includes designed nodes A, B, C, and D. Those time-slots are TDD time period that are illustratively shown in the timing diagram 140 of FIG. 7.

Figure 7:
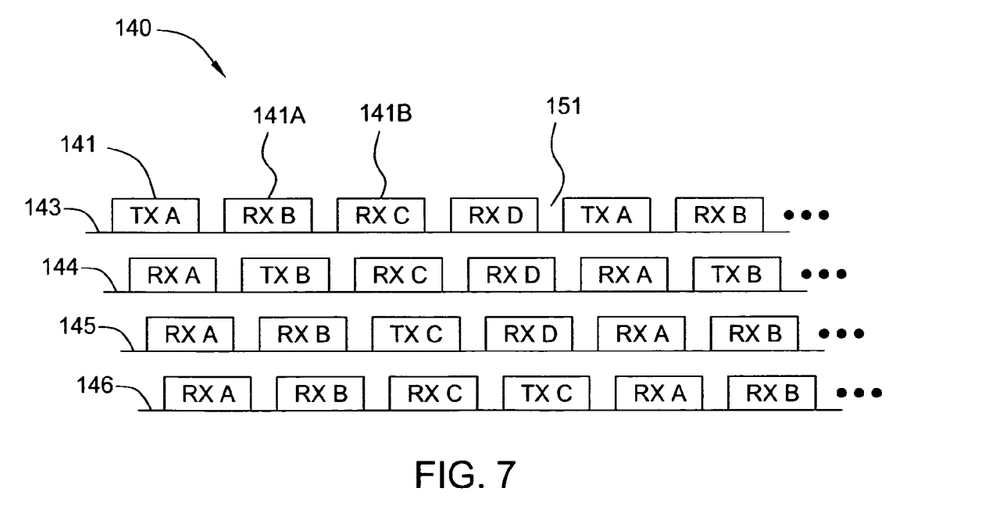
FIG. 7 illustrates transmission and reception packets for the mesh network neighborhood of FIG. 6.

Referring now to both FIGS. 6 and 7, time-slots 143, 144, 145, and 146 correspond to the communication time periods of nodes A, B, C, and D, respectively. Referring now to time-slots 143, the first packet 141 indicates that the A node is initially a PC (TX A). During the next four time-slots 143, the A node receives. For example, the second packet 141A shows the A node receiving from node B (RX B) and the third packet 141B shows the A node receiving from node C (RX C). When the A node acts as a PC the nodes B, C, and D act as receivers. Focusing now on the time periods between packets, those time periods are referred to as gaps 151. Consecutive packets in any of the time slots (143-146) are separated by gap. The start of each packet is synchronized in time, possibly by using the GPS card 310 in FIG. 3.

Figure 8:
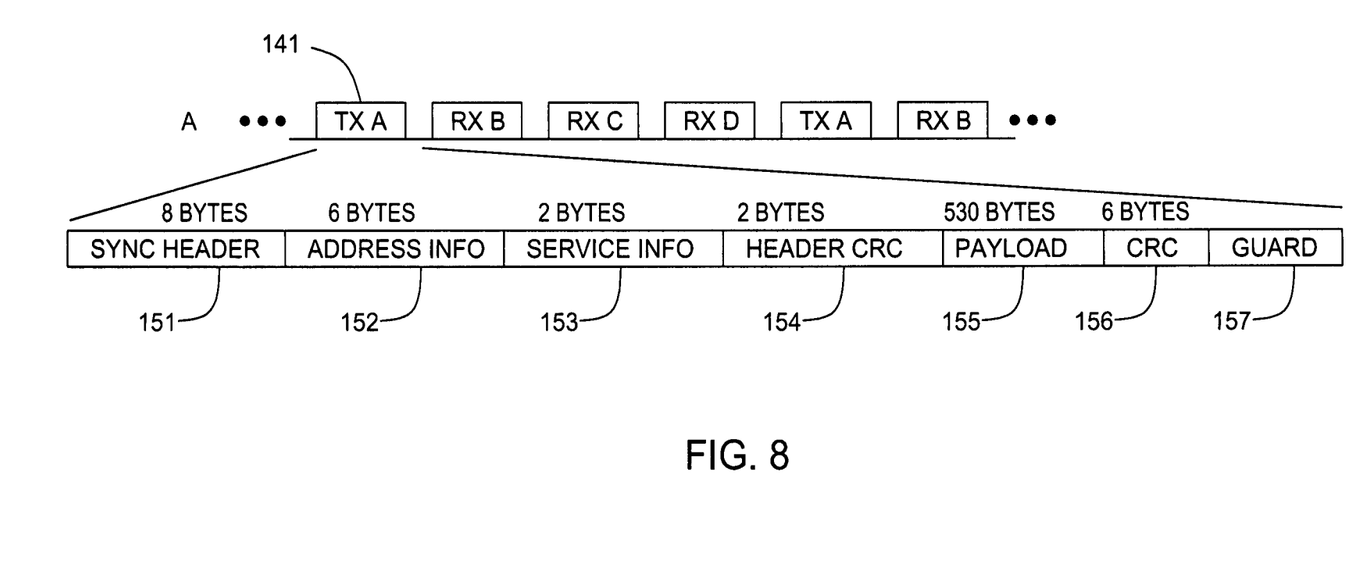
FIG. 8 illustrates a transmission packet used in FIG. 7.

Referring now to FIG. 8, there is shown a block diagram of an exemplary packet 141. The packet 141 includes a sync header 151, an address information field 152, a service information field 153, a cyclic-redundancy-check (CRC) header 154, an information or payload field 155, a CRC field 156, and a guard band 157.

The sync header 151 occurs at the start of a packet. That sync header includes sync signals that can be used by a receiver to identify the start of a packet and/or to prepare for reception. The address information field 152 may include the transmission source, the transmission destination, the specific routing, or like address information. The service information field 153 may include information indicating the type of payload in the payload field 155. Examples of the types of payloads are filled, partial, restricted, and operations and maintenance. Other service information may include the payload length, the packet signaling rate, the priority or other quality of service information, or the like. Notably, the payload 155 includes polling information that supports the mesh communication protocol shown in FIG. 5. Moreover, partial payloads may be filled at interim relay nodes. The internal payload structure depends in part upon the transport layer definitions. By way of example and not limitation, if the payload field 155 was 530 bytes, it may represent ten asynchronous data packets.

Since the starting time of each time-frame is known by all nodes 300, by assigning time-slots as described above the individual nodes 300 know when they are to act as PCs and when they are to act as receivers. Such is achieved by updating and storing the contents of the shared database. Assume that node A of FIG. 6 is a PC (TX A). By pre-scheduling communications, a node, say node C, knows that it is to receive information from PC A at a scheduled time. Node C then listens at the scheduled time. If node A has no information for node C, which would occur if the same polling times and frequencies used in the previous time-slots are to be used in the future, node A does not poll at the scheduled time. In response, node C continues its normal operation. However, if a node, say node B, is to receive new information, at the previously scheduled time node A polls node B by sending a packet 141 having information regarding future polling events as described above with regard to FIG. 5. Node B receives the information, compares that information with its internal database, and then responds to node A as described above. At the agreed upon future time, node B acts as a PC. In its turn, node B subsequently polls nodes A and C.

A potential complication arises if node A is still sending data to, say node B, when node C is scheduled to be polled. That is, agreeing on future polling events takes so long that it extends into node C's scheduled polling time. This problem can be handled in at least two different ways. First, node C could look for the start of a packet 141. If the synch header 151 and the address info 152 is not found, then node C will know that the ongoing message is not for it. Alternatively, node C could look for the start of a message at its scheduled time. The start of a message could be detected by a received signal that jumps from no energy to energy. If the start of a polling event is not found at its scheduled time, node C would know that the ongoing message is not for it.

Provided the occurrences of the time-slots are known, and provided that the receiving nodes recognize when information is meant of it, the mesh can dynamically configure itself. Accordingly, it should be understood that each node's configuration within the mesh network 100 is determined at least in part by its neighboring nodes. Thus, it should be appreciated that each node 300 may make polling decisions based on its needs.

While the foregoing is directed to embodiments of the present invention, other and further embodiments of the invention may be devised without departing from the basic scope thereof, and the scope thereof is determined by the claims that follow.

The invention claimed is:

1. A mesh network for providing data communications amongst a plurality of nodes, comprising:
    a source node for producing a first polling information and a second polling information, wherein the source node is a polling coordinator, wherein the first polling information and the second polling information form a portion of source node database information;
    a first node for processing the first polling information to update first node database information; and
    a second node for processing the second polling information to update second node database information, wherein a portion of the first node database information, a portion of the second node database information and a portion of the source database information combine to form a shared database that is accessible by a plurality of nodes comprising the source node, the first node and the second node,
    wherein each node of the plurality of nodes is assigned to act as the polling coordinator or a polled node on a node by node basis semi-autonomously, based on knowledge by the node of other nodes within an interference area according to a schedule stored in the shared database, where the schedule comprises polling time and frequencies and is updated when a scheduling conflict is identified, which conflict is identified when two nodes within the interference area are scheduled to simultaneously act as the polling coordinator, and wherein the polling time and frequency relate to future times and frequencies at which the nodes are assigned to one of either be polled or act as a polling coordinator.

2. The mesh network of claim 1, wherein the first node updates a first cost routing record using the first polling information and the second node updates a second cost routing record using the second polling information.

3. The mesh network of claim 1, wherein the first node compares the first polling information with the first node database information to produce first responsive information and the second node compares the second polling information with second node database information to produce second responsive information.

4. The mesh network of claim 1, wherein the first node communicates the first responsive information to the source node to update a source node cost routing record.

5. The mesh network of claim 4, wherein the second node communicates the second responsive information to the source node, wherein the first responsive information and the second responsive information is used to update the source node cost routing record.

6. The mesh network of claim 1, wherein the source node database information indicates a number of source allocated time-slots.

7. The mesh network of claim 6, wherein the source node deallocates a portion of the number of source allocated time-slots based on the first responsive information and the second responsive information.

8. The mesh network of claim 6, wherein the source node determines a number of available time-slots based on the source node database information.

9. The mesh network of claim 8, wherein the source node selects a portion of the number of available time-slots to use to communicate at least one of the first polling information or said second polling information, updates the source node database information and communicates the selected portion of the number of available time-slots to the first node and the second node.

10. The mesh network of claim 1, wherein the source node admits a third node into the mesh network by producing a third polling information at a predetermined third time using a portion of the source node database information, wherein the third node creates a third node database information using the third polling information.

11. A method of communicating within a mesh network, comprising:
    producing a first polling information and a second polling information at a source node, wherein the source node is a polling coordinator, wherein the first polling information and the second polling information form a portion of source node database information;
    updating a first node database information using the first polling information; and
    updating a second node database information using the second polling information, wherein a portion of the first node database information, a portion of the second node database information and a portion of the source database information combine to form a shared database that is accessible by a plurality of nodes comprising the source node, the first node and the second node,
    wherein each node of the mesh network is assigned to act as the polling coordinator or a polled node on a node by node basis semi-autonomously, based on knowledge by the node of other nodes within an interference area according to a schedule stored in the shared database, where the schedule comprises polling time and frequencies and is updated when a scheduling conflict is identified, which conflict is identified when two nodes within the interference area are scheduled to simultaneously act as the polling coordinator, and wherein the polling time and frequency relate to future times and frequencies at which the nodes are assigned to one of either be polled or act as a polling coordinator.

12. The method of claim 11 further comprising updating a first cost routing record using the first polling information and a second cost routing record using the second polling information.

13. The method of claim 11 further comprising:
    comparing the first polling information with the first node database information to produce first responsive information; and
    comparing the second polling information with second node database information to produce second responsive information.

14. The method of claim 13 further comprising communicating the first responsive information to the source node to update a source node cost routing record.

15. The method of claim 14 further comprising communicating the second responsive information to the source node, wherein the first responsive information and the second responsive information is used to update the source node cost routing record.

16. The method of claim 11, wherein the source node database information indicates a number of source allocated time-slots.

17. The method of claim 16, wherein reallocating the source allocated timeslots based on first responsive information and second responsive information.

18. The method of claim 16 further comprising determining a number of available time-slots based on the source node database information.

19. The method of claim 18 further comprising:
    selecting a portion of the number of available time-slots to use to communicate at least one of the first polling information or the second polling information; and
    updating the source node database information; and
    communicating the selected portion of the number of available time-slots to the first node and the second node.

20. The method of claim 11, further comprising:
    producing a third polling information at a predetermined third time using a portion of the source node database information to admit the third node into a mesh network;
    communicating the third polling information to a third node; and
    creating a third node database information using the third polling information.

* * * * *